3,241,912
PROCESS OF AQUEOUS CHLORINATION
Bernard H. Nicolaisen, Tonawanda, N.Y., assignor to Olin Mathieson Chemical Corporation, a corporation of Virginia
Filed Apr. 20, 1962, Ser. No. 189,159
6 Claims. (Cl. 23—85)

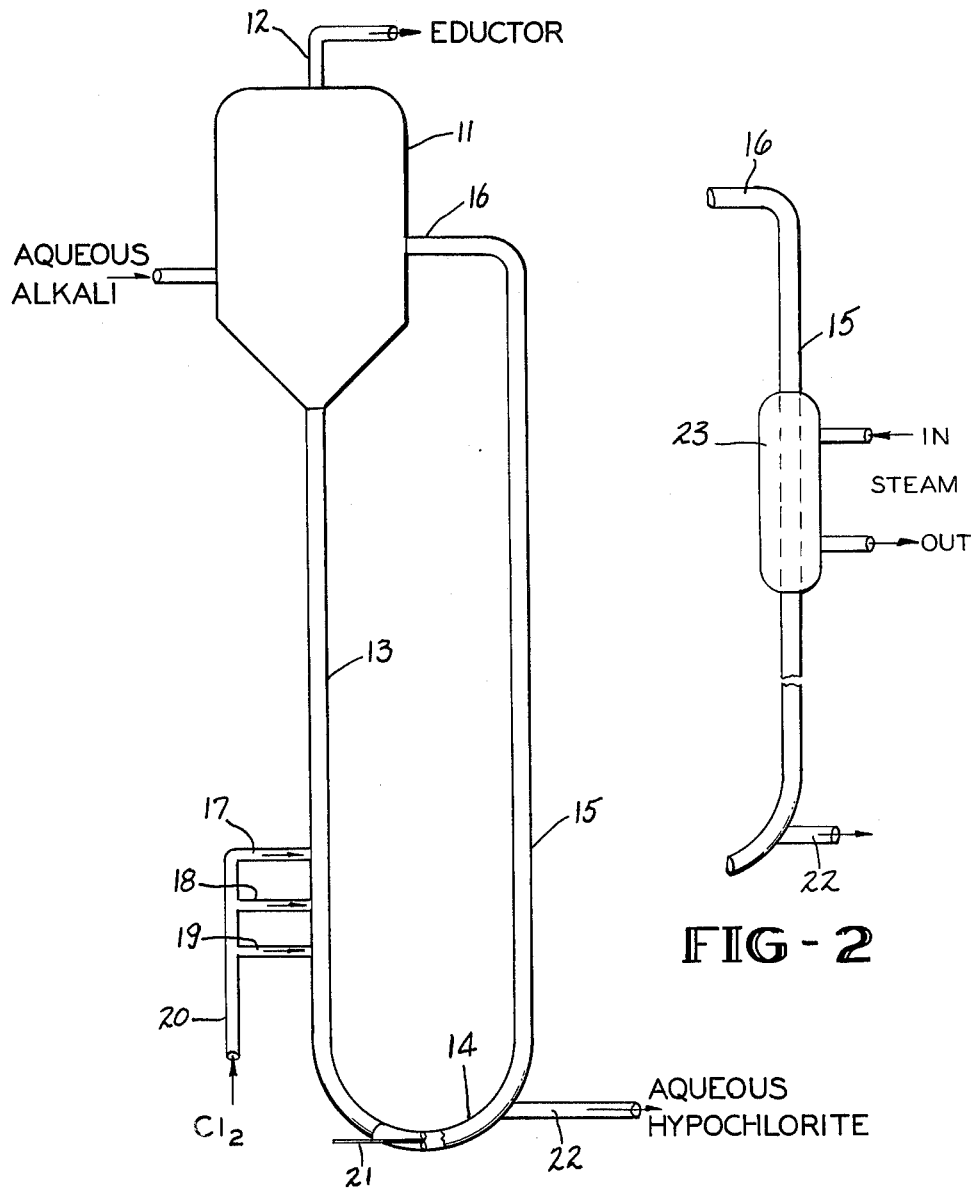

This invention relates to improvements in the chlorination of aqueous mixtures including single and polyphase systems, solutions, slurries, emulsions and suspensions. In a more particular aspect, the invention contemplates the chlorination of alkali metal hydroxides in aqueous solution, aqueous slurries of alkaline earth metal hydroxides and aqueous mixtures containing both alkali metal hydroxides and alkaline earth metal hydroxides. Also contemplated is the chlorination of other alkaline reacting solutions or slurries which may be organic or inorganic, for example, trisodium phosphate and sodium or potassium cyanurate. In a still more particular aspect, this invention relates to improvements in the manufacture of high test calcium hypochlorite containing a minimum of 70 percent of available chlorine. Thus it relates to improvements in the chlorination of aqueous mixtures of alkalies and subsequently converting them into high test calcium hypochlorite. The invention also relates to novel apparatus suitable for the improved chlorination operation.

In one process for the manufacture of high test calcium hypochlorite, a triple salt having the formula

is precipitated at temperatures below about 12° C. from a solution containing appropriate concentrations of calcium, sodium, chloride and hypochlorite ions. The triple salt is separated from the mother liquor and treated with appropriate quantities of aqueous chlorinated lime to convert the sodium hypochlorite to calcium hypochlorite. The triple salt is thus converted to a readily filterable dihydrate of calcium hypochlorite. The slurry is separated and the solid is dried by suitable means to obtain the calcium hypochlorite diluted with sodium chloride but substantially free from calcium chloride. The product contains more than 70 percent available chlorine and has an outstanding degree of stability in storage prior to use. The production of the triple salt and its conversion to high test hypochlorite is more fully described in U.S. Patent 1,787,048 issued December 30, 1930, to Robert Burns MacMullin and Maurice C. Taylor, assignors to Mathieson Alkali Works, Inc. now Olin Mathieson Chemical Corporation, successor.

To produce the triple salt conveniently, an aqueous mixture of lime and caustic is chlorinated to convert the alkalies therein to a mixture of their chlorides and hypochlorites. The process of the present invention describes an improved method for chlorinating the mixed alkalies and the method is also applicable to the chlorination of lime slurries and to solutions of alkali metal hydroxides. Thus in this aspect the method of the present invention relates to improvements in the chlorination of aqueous mixtures of at least one hydroxide selected from the group consisting of alkali metal and alkaline earth metal hydroxides.

In the chlorination of aqueous alkaline mixtures to form hypochlorites, a considerable amount of heat of reaction is liberated and must be removed. It is necessary to remove this heat and to maintain the temperatures in the reaction mixture below about 50° C. and preferably below about 30° C. to prevent the decomposition of the hypochlorite to chlorate, oxygen, and other undesired products. It has previously been proposed to effect this chlorination of alkalies to form hypochlorites on a large scale by the introduction of liquid chlorine, for example as described in U.S. Patents 1,426,-752; 1,481,106; 1,609,755 and 1,609,758, taking advantage of the heat of vaporization of the liquid chlorine to absorb the heat of reaction. To the extent that the liquid chlorine absorbs heat in vaporization, this known method effects a degree of improvement. However, the heat of reaction of the chlorine is considerably larger than its heat of vaporization and additional cooling must be provided. In ordinary heat exchangers, cooling coils or other devices known to the art, an aqueous slurry deposits solid materials on the cold heat exchange surfaces and insulates them from the circulating slurry, rendering difficult or impossible the control of the temperatures of the reaction. When this deposition is severe, the rate of chlorine addition must be reduced and the maximum production capacity of the equipment cannot be utilized. The coating formed on the cooling surfaces depends on the composition being chlorinated and may, for example, be the dihydrate of calcium hypochlorite, dibasic calcium hypochlorite, triple salt or other forms of chlorination products stable at the temperature provided by the cooling surface. In chlorinating caustic soda solutions, the solid phase may, under suitable conditions, be NaCl, $NaCl.2H_2O$ or sodium hypochlorite pentahydrate, $NaOCl.5H_2O$.

German Patents 941,970 and 963,418 disclose the use of reduced pressure to remove the heat evolved by the reaction of chlorine with aqueous alkalies to form hypochlorite solutions. The heat is removed in the form of the latent heat of vaporization of water. No cold surfaces are in contact with the reacting slurry and the heat is effectively removed while avoiding the insulation effect of precipitated solids on cold surfaces.

German Patent 941,970 proposes introducing chlorine under reduced pressure to obtain the cooling effect of evaporation of water. In such a simple system the chlorine, being the most volatile component of the system, tends to be removed in the direction of the reduced pressure and, in the absence of some elaboration of the system, the chlorine may largely escape without reaction from the aqueous mixture. This loss of chlorine results in low efficiency of conversion of the chlorine to the hypochlorite to a degree which cannot be tolerated. Furthermore, at ambient temperatures, chlorine is a fixed gas and the means of reducing the pressure on the system fail to function when large amounts of fixed gas are passed through. Thus water legs, steam jets and the like fail to reduce the pressure on a system to which a fixed gas is continuously supplied.

German Patent 963,418 further proposes to absorb chlorine in one stage and reduce the pressure in another stage and also to operate continuously. The patent teaches no adequate means for accomplishing the desired results and such means are not obvious to one skilled in the art.

The process of the present invention provides for utilization of the heat of vaporization of liquid chlorine and removes the remainder of the heat of reaction by evaporative cooling. The process of the present invention embodies an additional feature which comprises maintaining a head of the aqueous mixture at least 25 feet above the points of introduction of liquid chlorine. Because of the greater density of the aqueous mixtures compared to water, the pressure maintained at the points of chlorine introduction by 25 feet or more of aqueous mixture is approximately one atmosphere greater than that above the surface of the aqueous alkali. The effect is chlorination at atmospheric pressure or above while simultaneously evaporating water under substantially reduced pressure. Under these conditions the chlorine reacts extremely rapidly with the aqueous alkalies and is converted to chloride and hypochlorite.

In the reaction of liquid chlorine with aqueous alkalies, the heat of re-action is liberated largely at the point of chlorine introduction. Since the heat of vaporization of the chlorine is insufficient to absorb all of the heat of reaction, the aqueous mixture tends to overheat locally and to decompose the hypochlorite. To overcome this deficiency, the process of the present invention additionally requires the circulation of the body of aqueous liquor between the chlorination zone in which excess heat of reaction is liberated, and the evaporation zone at the surface of the liquid level of the aqueous alkali where heat is abstracted by evaporation. There are no heat transfer problems in this process. The circulation is rapid in order to maintain temperature and to prevent the decomposition of the hypochlorite. The circulation may, for example, be sufficient to cycle the total volume of liquor from the heat producing zone to the heat absorbing zone and back in less than about 2 minutes. Practically it is not feasible to effect the complete turnover of the aqueous liquor in less than about 1 minute. When the body of aqueous liquor is completely recycled in from 1 to 2 minutes, the time provided for chlorine retention at a pressure of atmospheric or above is at least 20 seconds. This is ample provision for complete reaction of the chlorine since this has been found to be less than about 10 seconds in this environment.

The process of the present invention thus comprises chlorinating a body of aqueous mixture by maintaining an ascending and a descending column of said mixture, said columns connected at top and bottom, each of said columns having a minimum depth of 25 feet, introducing chlorine into said descending column at a minimum depth of 25 feet and maintaining an absolute pressure below atmospheric at the top of said body.

It is a particular advantage of the method of the present invention that, when desired, the temperature in the chlorination zone is maintained easily so that any localized temperature rise in the chlorination zone does not exceed about 5° C. With ordinary care this temperature rise need not exceed about 2° C. With pressure above the liquid level of 20 to 50 millimeters of mercury, the temperatures are readily maintained below about 50° C. and may be maintained as low as about 30° C. Under these conditions of temperature, the evaporative chlorinators of the present invention are appropriately sized to provide retention times from about 45 minutes to 3 hours or more. With mixed alkalies, of which the alkali metal hydroxide is a substantial proportion, retention times of about 45 to 60 minutes are suitable to insure complete lime chlorination. In chlorinated lime slurries, which are more stable, retention times of 3 hours or more are feasible.

In the process of the present invention as applied to the chlorination of slurries containing lime to form hypochlorites, it is convenient to control the chlorination to maintain the circulating body of alkali at a pH of about 9.5 to 10.5. At this end point substantially no free lime exists in the solution. By means of suitable recorder-controllers, the pH can be used to control the input of fresh alkali and/or chlorine in the operation of a continuous system. It is particularly convenient, however, to add the fresh alkaline material at a constant rate and use the variation in pH to control the input of liquid chlorine into the system. Control may also be effected based on the measurement of oxidation-reduction potential.

In a more particular aspect of the present invention, the improved chlorination is utilized in the manufacture of high test calcium hypochlorite having an available chlorine content greater than about 70 percent. In this aspect of the process of the present invention, two chlorination processes are operated as described to provide a slurry of chlorinated mixed alkalies and a slurry of chlorinated lime. Both of the chlorinations are performed substanitally as described above in evaporative chlorinators which may be the same or different sizes. The quantity of lime slurry to be chlorinated is substantially less than the quantity of mixed alkalies. For this reason, in some circumstances, it may be desirable to chlorinate the lime slurry in a smaller unit than that provided for the chlorination of the mixed alkalies. However, surge tanks are provided for both of the intermediate chlorinated slurries and it is convenient in certain circumstances to make both units of approximately the same size. A particular advantage of the process of this invention in the chlorination of lime slurries is the avoidance of thick, partially chlorinated slurries which are difficult to stir, pump and further chlorinate and which are frequently encountered in prior art processes. In addition, the present process is more uniformly operated with less labor. Product quality and yields are improved.

The chlorinated mixed alkalies are transferred to crystallizers where they are further cooled to crystallization. A cake of triple salt is separated from a mother liquor and a portion of the latter is re-cycled to the crystallizers. The triple salt is transferred to agitators and combined with suitable proportions of chlorinated lime slurry to convert the sodium hypochlorite content of the triple salt to calcium hypochlorite dihydrate. Reaction of the calcium chloride in the chlorinated lime slurry with the sodium hypochlorite component of the triple salt converts the entire solid phase to calcium hypochlorite dihydrate and sodium chloride. The aqueous mixture is then filtered and the cake is dried to obtain high test calcium hypochlorite diluted with sodium chloride but substantially free from calcium chloride. The product is also low in lime, chlorates and other impurities.

Attached FIGURE 1 shows one embodiment of the chlorination operation of the present invention and an apparatus suitable for the process. The evaporative chlorinator of the present invention comprises a surge chamber 11 with an eductor line 12 at the top. The surge chamber 11 is drawn down into a pipe 13 of about 40 ft. or more in length to form a descending arm. It turns into a return bend 14 at the bottom and thence into an ascending arm 15 which returns at 16 to the surge tank. Near the bottom of descending arm 13, liquid chlorine inlets 17, 18, and 19 are provided to which liquid chlorine is supplied by line 20. At the bottom of return bend 14 a means of agitation 21 is provided to produce circulation in the chlorinator and a line 22 is provided for the removal of the aqueous hypochlorite product. The total operating capacity of the system is conveniently sized to produce at the desired rate.

In operation the system is charged with the aqueous alkali to be chlorinated until the surge tank is filled to a convenient liquid level usually about that of the return line of the circulating aqueous mixture. Circulation is started, the pressure is reduced at the top by any suitable eductor system and the introduction of liquid chlorine is started. pH measurement of the circulating liquor downstream from the chlorine inlets is used to control the rate of flow of chlorine. In batch operation, the pH controller is adjusted to stop the flow of chlorine at any desired pH but suitably and preferably about 9 to 9.5. Suitable low temperatures are maintained by the low pressure above the liquid level. Rapid circulation maintains the maximum temperature differential between the chlorination zone and the evaporative zone at less than about 2° C. In continuous operation when the pH downstream from the chlorination zone reaches about 10, the introduction of fresh aqueous alkali is started. Constant liquid level in the system is maintained by removal of aqueous hypochlorite.

While the pressure at the liquid level in the system varies between 20 and 50 mm. of mercury, the pressure below the level of the chlorine inlets, in the return bend and at corresponding elevations in the ascending arm is atmospheric or greater.

Extra retention time when desired may be provided in the system shown in the drawing by expansion of a portion of the diameter of the ascending arm 15, by one or more loops at suitable points in the system or by other means. Additional stirring may also be provided at other points in the system.

It is further particularly advantageous to start the process of the present invention by filling or partially filling the system with water, recycle or fresh solutions or slurries. The apparatus and process are surprisingly simple to construct and operate on the large scale with minimum requirements of labor.

FIGURE 2 shows a portion of the evaporative chlorinator of FIGURE 1 modified to be particularly suitable for the chlorination of caustic alkalies to form alkali metal chlorates. Heat exchanger 23 has been provided in ascending arm 16. It is an external jacket but internal heating coils can also be used. In the chlorate forming reaction, a temperature of about 150° to about 200° F. is desirably maintained to convert the hypochlorite initially formed. In this embodiment, introduction of gaseous chlorine is preferred. Evaporation suitably at about 200 to 300 millimeters mercury pressure is required to crystallize out a portion of the by-product sodium chloride. The slurry of salt crystals is removed, separated and the liquor is cooled to crystallize sodium chlorate which is separated as product. The introduction of caustic and removal of slurry can be continuous, preferably maintaining a pH of about 6 to 8 in the liquor in the ascending arm.

EXAMPLE I

A slurry of 35 percent lime and 65 percent water was circulated at a rate of 1000 gallons per minute in the chlorinator of FIGURE 1 while liquid chlorine was introduced into the descending arm at levels of 32, 38 and 44 feet below the surface at a rate of 1000 pounds per hour. By means of a water leg and steam ejector, the pressure above the liquid level was maintained at 25 mm. Hg absolute. This served to maintain the temperature of the slurry entering the descending arm at about 35° C. When the pH recorder-controller indicated a pH of about 10 at the bottom of the chlorinator, introduction of additional lime slurry at the liquid level was started and continued at a steady rate. The pH controller adjusted the chlorine flow to maintain a bottom pH of about 9 to 10. As the lime slurry was introduced, chlorinated slurry was removed to maintain constant liquid level in the system. The chlorinated slurry accumulated in a surge tank from which it was removed for further processing to form high test calcium hypochlorite.

EXAMPLE II

A mixed alkali slurry containing dissolved caustic soda and both dissolved and suspended lime was charged to and circulated in the chlorinator of FIGURE 1. The mixed alkali slurry contained caustic soda, lime and water in the proportions of 40:37:180 by weight. The pressure above the slurry was reduced to 20 mm. Hg absolute. Liquid chlorine was introduced at three levels, all more than 32 feet below the liquid level. The temperature of the slurry entering the descending arm was maintained at 30° C. by evaporation under reduced pressure. When the pH recorder-controller indicated a pH of about 10 at the bottom of the chlorinator, introduction of additional mixed alkali slurry was started and continued at a constant rate. The chlorinated slurry was withdrawn and accumulated in a surge tank from which it was removed for further processing to form high test calcium hypochlorite.

EXAMPLE III

The apparatus of FIGURE 1 was charged with 40 percent caustic soda which was circulated under an absolute pressure of 20 mm. Hg at the top liquid level. The temperature was thus maintained at about 25° C. Liquid chlorine was introduced to a pH of 9.8. Sodium chloride crystallized out. The slurry of crystals was pumped from the chlorinator to a centrifuge to separate the salt. The filtrate was diluted with water to a content of 5 percent of sodium hypochlorite for use as liquid bleach.

EXAMPLE IV

A lime slurry was chlorinated as described in Example I and a mixed alkali slurry was chlorinated as described in Example II. On cooling the chlorinated mixed alkali slurry to below 10° C., a thick mass of triple salt was produced which was partially de-watered on a rotary filter to form a thick paste. A portion of the filtrate was returned to the cooling tanks. The cake was transferred to jacketed kettles where it was agitated and mixed with the chlorinated lime slurry, proportioned to provide substantially one mole of calcium chloride to each two moles of sodium hypochlorite in the triple salt. The mixture was filtered and the cake was dried to produce high test calcium hypochlorite.

EXAMPLE V

A fifty percent solution of sodium hydroxide in water was continuously added to and circulated in the apparatus shown in FIGURE 1, modified as shown in FIGURE 2. Gaseous chlorine was introduced into the circulating liquor in the descending arm at a point where the pressure was above 1 atmosphere at a rate adjusted to maintain a pH of 7 in the liquor in the ascending arm. The pressure at the top of the liquid was maintained at approximately 270 mm. Hg which resulted in a temperature of 200° F. Additional heat was added to the system through the heat exchanger in the ascending arm. Sodium chloride was filtered from the continuously withdrawn slurry. Sodium chlorate was crystallized from the resulting mother liquor by cooling. The sodium chlorate was separated by centrifuging and the mother liquor recycled to the chlorinator.

EXAMPLE VI

A slurry formed by mixing cyanuric acid, sodium hydroxide and water in the proportions of 13:8:79 was charged to and circulated in the chlorinator of FIGURE 1. The pressure of the top of the liquid was maintained at 16 mm. Hg which resulted in a temperature of 20° C. Liquid chlorine was introduced into the circulating slurry in the descending arm at a point where the pressure was near atmospheric. Any nitrogen trichloride by-product of the chlorination was removed in the stream of evaporating water vapor. The chlorine rate was adjusted to maintain a pH of about 2.5 in the slurry in the ascending arm. When the chlorination was complete the dichlorocyanuric acid product was separted from the mother liquor by centrifuging.

What is claimed is:

1. Process of producing a hypochlorite by chlorinating an aqueous body containing at least one hydroxide selected from the group consisting of alkali metal and alkaline earth metal hydroxides which comprises maintaining an ascending and a separate descending column of said mixture, said columns connected at top and bottom to provide circulation of said body, each of said columns having a depth of at least 25 feet, introducing liquid chlorine into said descending column at a lepth of at least 25 feet and maintaining an absolute pressure of about 20 to about 50 millimeters of mercury at the top of said body.

2. Process of claim 1 in which a fresh aqueous mixture is introduced at a substantially steady rate, the pH of the portion of the aqueous body in the ascending column is maintained between a pH of 9 and 10.5 by controlling the chlorine flow rate and the volume of the aqueous body is maintained substantially constant by continuous removal of a portion of the said aqueous body.

3. Process for the manufacture of high test calcium hypochlorite which comprises separately chlorinating a first aqueous mixture of lime and a second aqueous mixture of lime and caustic soda by the process of claim 1, cooling the chlorinated aqueous mixture of lime and caustic soda to crystallize the triple salt of the formula $Ca(OCl)_2 \cdot NaOCl \cdot NaCl \cdot 12H_2O$ and to form a slurry of said triple salt in a mother liquor and separating said triple salt from said mother liquor, reacting the triple salt with the chlorinated aqueous mixture of lime, separating the solid phase from the liquor and drying the solid phase to form high test calcium hypochlorite.

4. Process of claim 3 in which the molar ratio of caustic soda to lime in the aqueous mixture is 2:1.

5. Process of claim 4 in which the molar ratio of calcium chloride in the chlorinated aqueous mixture of lime to the sodium hypochlorite in the triple salt is substantially 1:2.

6. Process of producing a chlorate by chlorinating a body of aqueous mixture containing at least one hydroxide selected from the group consisting of alkali metal and alkaline earth metal hydroxides which comprises maintaining an ascending and a separate descending column of said mixture, said columns connected at top and bottom to provide circulation of said body, each of said columns having a depth of at least 25 feet, introducing chlorine into said descending column at a depth of at least 25 feet, maintaining the temperature of said body at about 150° to about 200° F. and maintaining the absolute pressure from about 20 to 300 millimeters of mercury at the top of said body.

References Cited by the Examiner

UNITED STATES PATENTS

| | | | |
|---|---|---|---|
| 1,426,752 | 8/1922 | MacMahon | 23—86 |
| 1,481,106 | 1/1924 | MacMahon | 23—86 |
| 1,609,755 | 12/1926 | MacMahon | 23—86 |
| 1,609,758 | 12/1926 | MacMahon | 23—86 |
| 1,774,366 | 8/1930 | Gluud et al. | 23—260 |
| 1,787,048 | 12/1930 | MacMullin et al. | 23—86 |
| 2,272,818 | 2/1942 | Petroe | 23—1 |
| 2,332,527 | 10/1943 | Ryzel | 23—260 |
| 2,776,284 | 1/1957 | Hood | 23—252 X |
| 2,952,679 | 9/1960 | Perret | 260—248 |
| 2,956,056 | 10/1960 | Christian | 260—248 |

FOREIGN PATENTS

| | | |
|---|---|---|
| 941,970 | 4/1956 | Germany. |
| 963,418 | 5/1957 | Germany. |
| 714,234 | 8/1954 | Great Britain. |

OTHER REFERENCES

Mellor: Comprehensive Treatise on Inorganic to Theoretical Chemistry, vol. 2, pp. 297–8 (1922), Longmans, Green and Co., New York, N.Y.

MAURICE A. BRINDISI, *Primary Examiner.*

GEORGE D. MITCHELL, *Examiner.*